Aug. 12, 1941.   G. L. LANG   2,252,572
COMBINED THIXOTROMETER AND VISCOSIMETER
Filed June 16, 1938
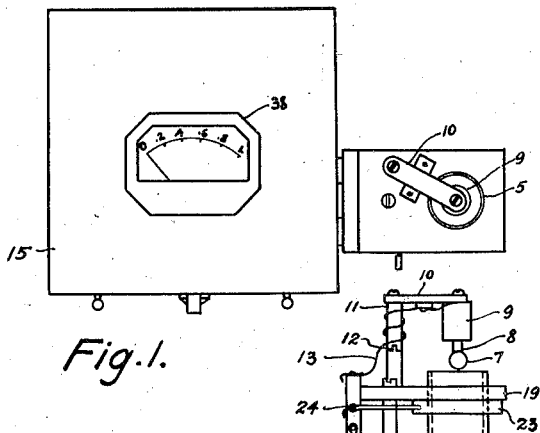
Fig.1.
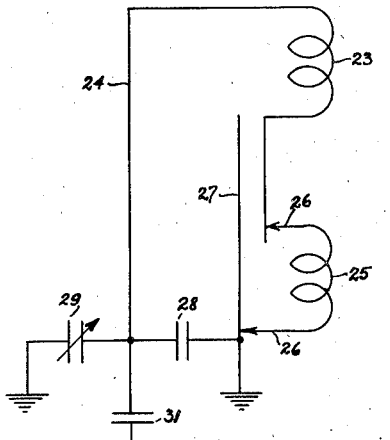
Fig.2.
Fig.3.
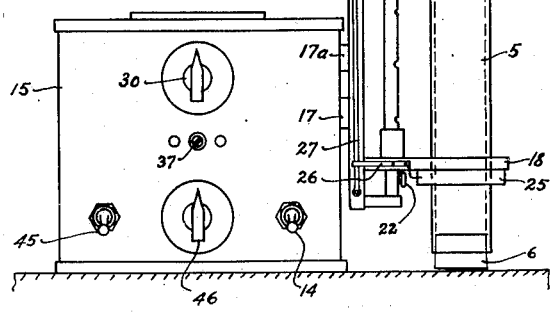
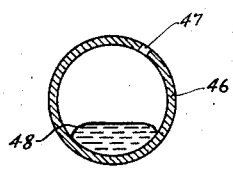
Fig.4.
Gregor Leighton Lang
Inventor
By M. Björndal
Attorney.

Patented Aug. 12, 1941

2,252,572

UNITED STATES PATENT OFFICE 2,252,572

COMBINED THIXOTROMETER AND VISCOSIMETER

Gregor Leighton Lang, Newark, N. J.

Application June 16, 1938, Serial No. 214,006

2 Claims. (Cl. 265—11)

My invention relates to improvements in apparatus for the measurement of the thixotropic and viscous qualities of liquids and semi-plastics.

While the falling ball method of measuring the viscosity of liquids has been known and widely used, its application has been considerably limited as it could only be used with liquids of sufficient transparency to make the ball visible. The present invention removes this limitation and permits the use of this method for opaque liquids as well as plastic materials. By the use of balls of different specific gravities the range of this instrument may be greatly extended.

It has also been found that this invention will permit the accurate determination of the thixotropic qualities of paint and other colloidal solutions. The thixotropic state is determined by the size of the molecular aggregates present as well as by the electric charges of same. A thixotropic paint, for instance, will coagulate and thicken, if left standing, but this coagulation process is immediately reversible upon any mechanical stirring or vibration of the paint. The viscosity in the coagulated and non-coagulated states will give a measure of the thixotropic quality of the solution, this again is valuable in the determination of the covering quality of a paint. Due to the exceedingly gentle motion of the ball through the liquid this method is particularly well suited for the purpose.

An important object of my invention is to provide means for the accurate timing of the falling ball in opaque liquids.

A further object of the invention is to provide electrical releasing means and visible indicating means giving positive and instantaneous indications of the passing of the ball over given measured distances.

Another object of my invention is to provide a meter which by its ingenious construction will permit the measurement of the thixotropic qualities of colloidal solutions.

Other objects and advantages of the invention will be apparent during the course of the following description.

In the accompanying drawing, forming part of this specification, and in which like numerals are employed to designate like parts throughout the same, Figure 1 is a plan view of the assembled instrument, with the ball and specimen container in operating position, Figure 2 is a front elevation of the same instrument as shown in Fig. 1, Figure 3 is a circuit diagram of the instrument, and, Figure 4 shows a spherical ball calibrated to a given effective specific gravity.

In the drawing, wherein for the purpose of illustration, is shown a preferred embodiment of my invention, the numeral 5 designates the specimen container, usually a glass tube, with a stopper 6 at one end for easy cleaning. The steel ball 7 is suspended from the soft, annealed iron core 8 of the coil 9 which is supported from arm 10 and post 11. For convenience in operation the post 11 consists of a sleeve with a slot 12 which may be lifted slightly and rotated sidewise to bring the coil 9 out of the way of the container 5. When placed in operating position, however, the slot 12 insures the exact location of the ball 7 in the axis of the container 5. Leads 13 connect coil 9 to switch 14 and a suitable source of power located inside the box 15.

A support 16 mounted on box 15 at 17 and 17a carries two horizontal brackets 18 and 19. The lower bracket 18 is slidably mounted on the vertical support 16 and the vertical guide rod 20. The rod 20 has indents 21 at regular intervals, and an indexing mechanism releasable by lever 22 secures the bracket 18 in any one of these positions, as desired. The fixed upper bracket 19 carries a coil 23 with leads 24 going to the box 15. The lower movable bracket 18 carries a coil 25 the leads of which are connected to springs 26 sliding on conductors 27 mounted on the sides of the vertical support 16.

The vacuum tube circuit, as shown in Fig. 3, is basically a Hartley oscillator circuit with certain important modifications to permit its use in the present case. The component parts of the lower part of the circuit are housed in the box 15, while the coils 23 and 25 are mounted on the brackets 19 and 18, respectively, as described supra. In addition to the components already mentioned the circuit consists of the condenser 28 shunting the leads 24 and 27 from the inductively bucking, series connected coils 23 and 25. A variable condenser 29 is operated from knob 30 on the front of box 15. A further condenser 31 connects the tuned coil circuit to the grid circuit of the vacuum tube 32. The coils 33 and 34 and the variable condenser 35 and the fixed condenser 36 are parts of the well known Hartley oscillator circuit. The trimmer condenser 35 is operable by a slotted rod 37 which may be reached from the front of box 15.

In the usual center-tap connection to coil 33 has been added the milliammeter 38 with the shunting condenser 39 and the shunting resistors 40 and 41 of which 40 is variable. The meter 38 is mounted on top of box 15 as shown in Fig. 1. The filament resistor 42 and "A" battery 43, as well as the "B" battery 44 are the same as commonly used in such circuits.

In a preferred embodiment of my invention the following values of components are used: Coil 33, center-tap R. F. coil as used in broadcast band; coil 34—12 mH. R. F.; viscosimeter coils 23 and 25—18 turns each; condenser 35—400 mmF.; condenser 39—0.002 mF.; condenser 36—0.002 mF.; condenser 31—50 mmF.; condenser 28—0.00025 mF.; condenser 29—0.00014 mF variable; resistor 42—3.3 ohm; resistor 40—1000 ohm variable and resistor 41—400 ohm.

The operation of my invention is as follows: The medium to be tested is placed in the container 5 and a suitable ball is selected and supported from core 8 and the arm 10 is swung into operating position. The switch 45 closes the filament circuit and starts the vacuum tube 32. Changes in the viscosimeter coil circuit are compensated for by tuning condenser 29, while resistor 40 is varied until meter 38 shows maximum deflection when the ball passes through the coils 23 and 25 concentric with the container 5. The meter deflection at the passage of the ball through the coils 23 and 25 is caused by the absorption of R. F. energy in the ball, and the ball thus momentarily changes the effective characteristic of the coils as it passes through both in succession, making two large deflections on the meter. By timing the intervening period between these two deflections a measure of the viscosity of the tested medium is obtained. It is obvious that any suitable method of timing, either by electrical means, or simply with a stop watch, may be applied. To make the two meter deflections easily readable it is imperative that the meter be set to greatest sensitivity by adjusting resistor 40 operated by knob 46 on the front of box 15. As mentioned supra balls of different specific gravity may be used to obtain good readings. In this case an electro-mechanical release of the ball is used instead of the magnetic release illustrated. As mentioned supra the present invention may be used as a thixotrometer by measuring the viscosity of a thixotropic liquid at various time intervals after stirring. By plotting the viscosity against time a curve will be obtained which gives the thixotropic character of the liquid. In these measurements it is important to maintain identical conditions at all measurements. In other words the colloidal liquid should be subjected to a constant rate of shear, or rate of displacement. It has been found that this can be obtained in a satisfactory manner by using balls of graduated effective specific gravity, such as shown in Fig. 4. These balls consist of a metallic sphere 46 with a small aperture through which mercury or other suitable materials may be inserted. After the desired weight has been obtained the hole 47 is closed and the outside surface ground perfectly spherical. The test procedure for thixotrometric determinations is then as follows: The slidable bracket 18 is set at a given distance and balls of a given diameter are selected. Then balls of graduated effective specific gravity are dropped until one is found which will drop the given distance in a given time. In determining the proper ball for initial test the sample must be stirred immediately prior to the dropping of each ball. Measurements at definite time intervals with the same balls of given size and effective specific gravity will then give results which may be interpreted by plotting a curve of the ball velocity vs. time, measured from the initial stirring.

It is obvious that the above described test procedure may also be used by selecting a given distance and given time. Balls of graduated diameters but of given specific gravity may then be used, the viscosity then being found from the diameter of the ball which will drop a given distance in given time.

It is to be understood that the form of my invention, herewith shown and described, is to be taken as a preferred example of the same, I do not wish to be limited to the circuit shown, and various changes in the circuit, shape, size and arrangement of parts may be resorted to, without departing from the spirit of my invention, or the scope of the subjoined claims.

Having thus described my invention, I claim as new and desire to secure by Letters Patent of the United States:

1. A viscosimeter of the character described having in combination, a cylindrical specimen container, a vertical support, a fixed mounting bracket near the top of said support, a slidable mounting bracket having a hole for said specimen container and being slidable vertically on said vertical support, an indent locking mechanism for fixing said slidable mounting bracket in various positions on said vertical support, a metallic ball, a movable electrically operated supporting and releasing mechanism holding said ball above and coxial with said specimen container, two coils supported by said mounting brackets and placed coaxially on said specimen container, an oscillator circuit connected to said coils, variable tuning means for adjusting the circuit to greatest sensitivity, and indicating means for giving a positive indication when said metallic ball moves through said coils.

2. A viscosity meter of the character described comprising a test tube adapted to contain a fluid through which a ball may be passed; two coils placed around said test tube a given distance apart; a condenser connected in series with said coils to form a tuned circuit, one side of said condenser being grounded; a second condenser connecting the other side of said first condenser to ground, said second condenser being variable; a Hartley oscillator circuit including an oscillatory coil and a vacuum tube; an indicating meter connected between the center tap of the oscillator coil and the tube filament; a third condenser coupling said tuned circuit to the grid of the tube whereby any changes in the inductance of the coils of the tuned circuit such as caused by the falling of said ball will be reflected upon said indicating meter.

GREGOR LEIGHTON LANG.